(12) United States Patent
Tanaka et al.

(10) Patent No.: US 7,552,834 B2
(45) Date of Patent: Jun. 30, 2009

(54) SYNTHETIC RESIN HEAT-RESISTANT BOTTLE TYPE CONTAINER

(75) Inventors: Toshimasa Tanaka, Tokyo (JP); Tadayori Nakayama, Matsudo (JP); Shinichi Tabata, Matsudo (JP); Takao Iizuka, Tokyo (JP)

(73) Assignee: Yoshino Kogyosho Co., Ltd., Tokyo (JP)

( * ) Notice: Subject to any disclaimer, the term of this patent is extended or adjusted under 35 U.S.C. 154(b) by 175 days.

(21) Appl. No.: 10/580,608

(22) PCT Filed: Nov. 24, 2004

(86) PCT No.: PCT/JP2004/017419

§ 371 (c)(1), (2), (4) Date: Jun. 21, 2006

(87) PCT Pub. No.: WO2005/051778

PCT Pub. Date: Jun. 9, 2005

(65) Prior Publication Data

US 2007/0075031 A1    Apr. 5, 2007

(30) Foreign Application Priority Data

Nov. 26, 2003   (JP)   ............................. 2003-395564
Nov. 24, 2004   (JP)   ............................. 2004-339150

(51) Int. Cl.
*B65D 1/02* (2006.01)
*B65D 1/40* (2006.01)

(52) U.S. Cl. ...................... 215/381; 215/382; 220/669; 220/675

(58) Field of Classification Search .................. 215/381, 215/383, 379, 384, 900; 220/666, 669, 675
See application file for complete search history.

(56) References Cited

U.S. PATENT DOCUMENTS

| 3,325,031 A * | 6/1967 | Singier ........................ 215/247 |
| 5,064,081 A * | 11/1991 | Hayashi et al. ............. 215/373 |
| 5,303,834 A * | 4/1994 | Krishnakumar et al. ..... 215/381 |
| 5,341,946 A * | 8/1994 | Vailliencourt et al. ....... 215/381 |
| 5,381,910 A * | 1/1995 | Sugiura et al. .............. 215/398 |
| 6,349,838 B1 * | 2/2002 | Saito et al. .................. 215/371 |
| 6,981,604 B2 * | 1/2006 | Iizuka et al. ................. 215/381 |

(Continued)

FOREIGN PATENT DOCUMENTS

JP    U 4-3910    1/1992

(Continued)

*Primary Examiner*—Sue A Weaver
(74) *Attorney, Agent, or Firm*—Oliff & Berridge, PLC

(57) ABSTRACT

A slender synthetic resin heat-resistant bottle type container having a circumferential draw ratio of 2.8 or less, for example, comprises at least one pressure reduction absorbing panel (5) provided at a container body part, wherein the pressure reduction absorbing panel is provided with at least one convex portion (6) having a width larger at a lower side than at an upper side as viewed in a circumferential direction of the container. Alternatively, each pressure reduction absorbing panel has a border line bulged toward a container bottom part. This causes a resin to be smoothly stretched even at mold surface portions corresponding to concave and convex portions of a container body part surface upon blow molding. These avoid a defective appearance of the container and do not adversely affect heat resistance thereof.

15 Claims, 7 Drawing Sheets

U.S. PATENT DOCUMENTS

2001/0054597 A1* 12/2001 Ozawa et al. ............... 215/381
2002/0088767 A1* 7/2002 Saito et al. .................... 215/40
2004/0195199 A1* 10/2004 Maki et al. .................. 215/381

FOREIGN PATENT DOCUMENTS

| JP | U-04-003910 | 1/1992 |
|----|----|----|
| JP | A-07-329158 | 12/1995 |
| JP | A 7-329158 | 12/1995 |
| JP | U-3050588 | 5/1998 |
| JP | U 3050588 | 5/1998 |
| JP | A-10-249922 | 9/1998 |
| JP | A 10-249922 | 9/1998 |
| JP | A 11-180428 | 7/1999 |
| JP | A-11-180428 | 7/1999 |

* cited by examiner

SYNTHETIC RESIN HEAT-RESISTANT BOTTLE TYPE CONTAINER

This application is the U.S. National Stage of PCT/JP2004/017419 filed Nov. 24, 2004, which claims priority from Japanese Patent Application No. JP2003-395564 filed Nov. 26, 2003, and Japanese Patent Application No. JP2004-339150 filed Nov. 24, 2004, the entire disclosures of which are incorporated herein by reference there to in their entireties.

1. Technical Field

The present invention relates to a synthetic resin heat-resistant bottle type container, and particularly to a bottle type container having a plurality of pressure reduction absorbing panels at a body part.

2. Background Art

In a synthetic resin heat-resistant bottle having a plurality of pressure reduction absorbing panels at a body part, concave and convex portions are formed on a body part surface to delimit the pressure reduction absorbing panels, respectively. Thus, in blow molding such a bottle, it has been likely that smooth stretching of a resin is obstructed at mold surface portions corresponding to the concave and convex portions of the body part surface.

Such a phenomenon is particularly significant in slender bottles each having a circumferential draw ratio of 2.8 or less, and particularly 2.65 or less, for example. Here, the "circumferential draw ratio" can be defined as a dimensional ratio between: a dimension from a central axis of a bottle to a thickness center of a wall face of a body part of the bottle (in case of a rectangular bottle, a wall face of a body part of the bottle except for corner portions thereof); and a dimension from a central axis of a preform to be used for molding of the bottle, to a thickness center of a wall face of a body part of the preform.

Namely, when a body part surface of such a slender bottle is formed with concave and convex portions that lead to obstructions of a mold inner surface against vectors directed from a mouth part toward a bottom part of the bottle, resin accumulation, whitening, and the like are frequently caused at mold surface portions corresponding to the concave and convex portions of the body part surface. This not only results in a defective appearance of the container but also has an adverse affect on heat resistance thereof.

Note that to avoid locally decreased wall thickness caused by stretching of a resin upon blow molding, JP 2002-255141A proposes a heat-resistant bottle provided with a lateral concave rib along a boundary between a shoulder part and a body part of the bottle in a manner that the lateral concave rib has a rib bottom diameter set at 0.85 to 0.92 times an outer diameter of a cylindrical surface of the body part.

DISCLOSURE OF THE INVENTION

It is an object of the invention to propose a novel and slender bottle that solves the above-described problems in the related art and allows a resin to smoothly stretch even at mold surface portions corresponding to concave and convex portions of a body part surface upon blow molding. This avoids a defective appearance and does not adversely affect heat resistance of the bottle.

The invention resides in a synthetic resin heat-resistant bottle type container having pressure reduction absorbing panels at a container body part and having a circumferential draw ratio of 2.8 or less, for example, wherein the bottle type container comprises at least one convex portion along a wall face of each of the pressure reduction absorbing panels. The convex portion has a width larger at a lower side than at an upper side as viewed in a circumferential direction of the container.

According to the above configuration, the convex portion formed at the wall face of the pressure reduction absorbing panel is configured to have a width larger at a lower side than at an upper side as viewed in a circumferential direction of the container. Thereby, obstructions against vectors directed from a container mouth part toward a bottom part in a stretching direction of a resin upon blow molding are rarely caused. This makes it possible to restrict the occurrence of resin accumulation, whitening, and the like, and to mold the container into a desired wall thickness.

It is preferable that the at least one convex portion comprises two or more convex portions aligned in a stepwise configuration on the wall face of the pressure reduction absorbing panel.

It is also preferable that the convex portion has ridge lines in an inverted V-shape downwardly widened from a container mouth part toward a bottom part. In this case, it is desirable that the ridge lines define a central angle of 60° to 125° therebetween.

Instead of the above configuration, it is possible that the convex portion is in a substantially trapezoidal shape having an upper side and a lower side parallel to each other, the lower side being longer than the upper side. Also, it is desirable that the trapezoid includes opposed sides that are non-parallel to each other and cooperatively define an angle of 60° to 125° therebetween.

A resin is more effectively stretched during blow molding when the at least one convex portion comprises two or more convex portions aligned in a stepwise configuration on the wall face of the pressure reduction absorbing panel, and/or when a convex portion is formed at a wall face of the panel having ridge lines in an inverted V-shaped or having a substantially trapezoidal shape with a lower side longer than an upper side. This assuredly restricts occurrence of resin accumulation, whitening, and the like, and molds the container into a desired wall thickness.

Further, it is desirable that the pressure reduction absorbing panels each have a border line bulged toward the container bottom part along the wall face of the applicable pressure reduction absorbing panel. Although the boundary between each pressure reduction absorbing panel and the body part at the upper side of the panel is an area where a resin accumulation is particularly apt to be caused upon blow molding, the border line at such a site is configured to be bulged toward the container bottom part along the wall face of the applicable panel, thereby enabling effective promotion of uniform stretching of resin.

It is most effective to combine: (1) the configuration including the convex portion which is provided along a wall face of the pressure reduction absorbing panel and having a width larger at a lower side than at an upper side as viewed in a circumferential direction of the container; with (2) the configuration including the pressure reduction absorbing panel having the border line bulged toward the container bottom part along the wall face of the panel. However, it has been confirmed that stretching of resin can be promoted to a practically sufficient level to thereby practically sufficiently restrict occurrence of resin accumulation, even by only one of the configurations.

BRIEF DESCRIPTION OF THE DRAWINGS

The present invention will be described in more detail with reference to the drawings.

BEST MODE FOR CARRYING OUT THE INVENTION

Figure 1A:
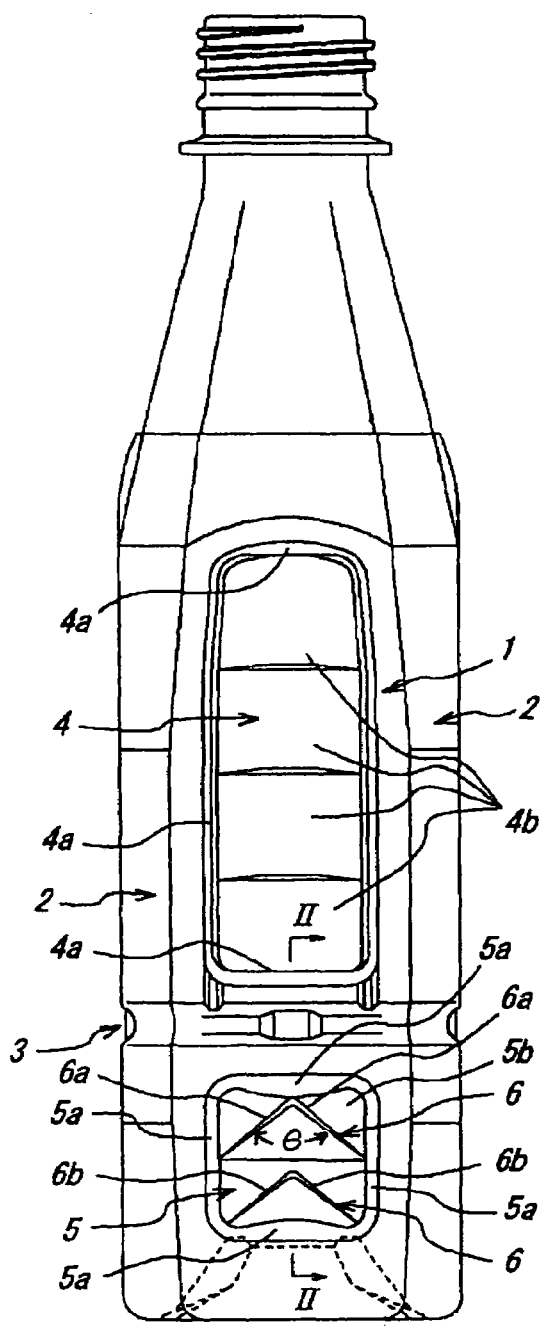
FIGS. 1A, 1B and 1C are a front view, a plan view, and a bottom view of a container according to an embodiment of the present invention, respectively.
Figure 1B:
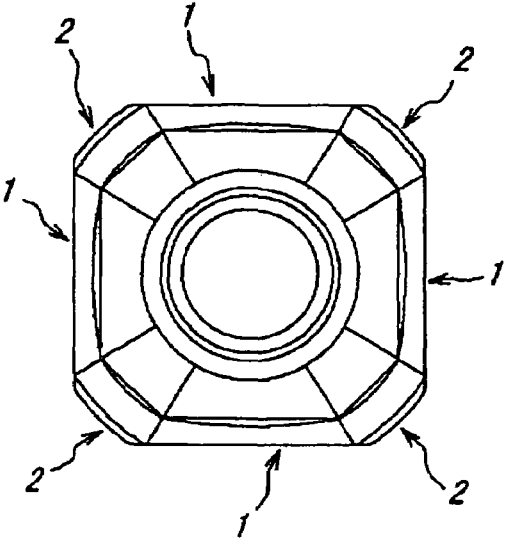
Figure 1C:
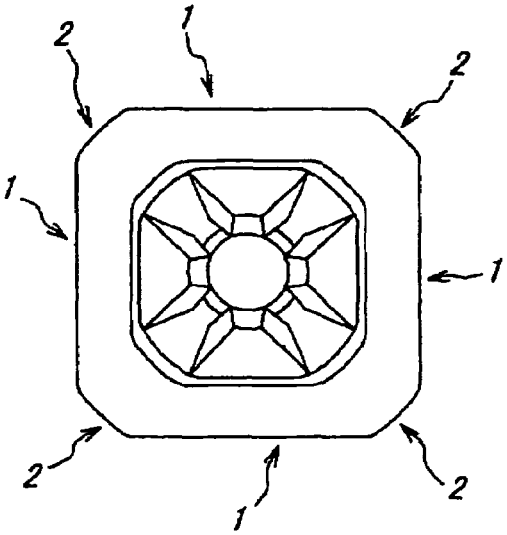

FIGS. 1A, 1B and 1C show an embodiment of a synthetic resin heat-resistant container according to the present invention constituted as a slender rectangular bottle having a filling capacity of about 350 milliliter and a circumferential draw ratio of 2.8 or less. Reference numerals 1 designate wall faces constituting a container body part. Reference numerals 2 designate corner portions connecting end portions of wall faces 1 to similarly constitute the container body part. Reference numeral 3 designates a groove portion provided around the container body part. Reference numerals 4 designate upper panels provided at the wall faces 1 above the groove portion 3 so as to absorb pressure reduction. Reference numerals 5 designate lower panels provided at the wall faces 1 below the groove portion 3 so as to absorb pressure reduction.

The upper panels 4 and lower panels 5 are connected to the container body part through sidewalls 4a and 5a directed toward an inside of the container, respectively, and edges of the sidewalls 4a and 5a constitute borders of the panels, respectively. Among them, each sidewall 5a positioned at an upper side of the lower panel 5 comprises a partial sphere defined by an arcuate border line bulged toward a container bottom part. Namely, each sidewall 5a located at the upper side of the lower panel 5 has a width larger at an upper side than at a lower side as viewed in a circumferential direction of the container.

Figure 2:
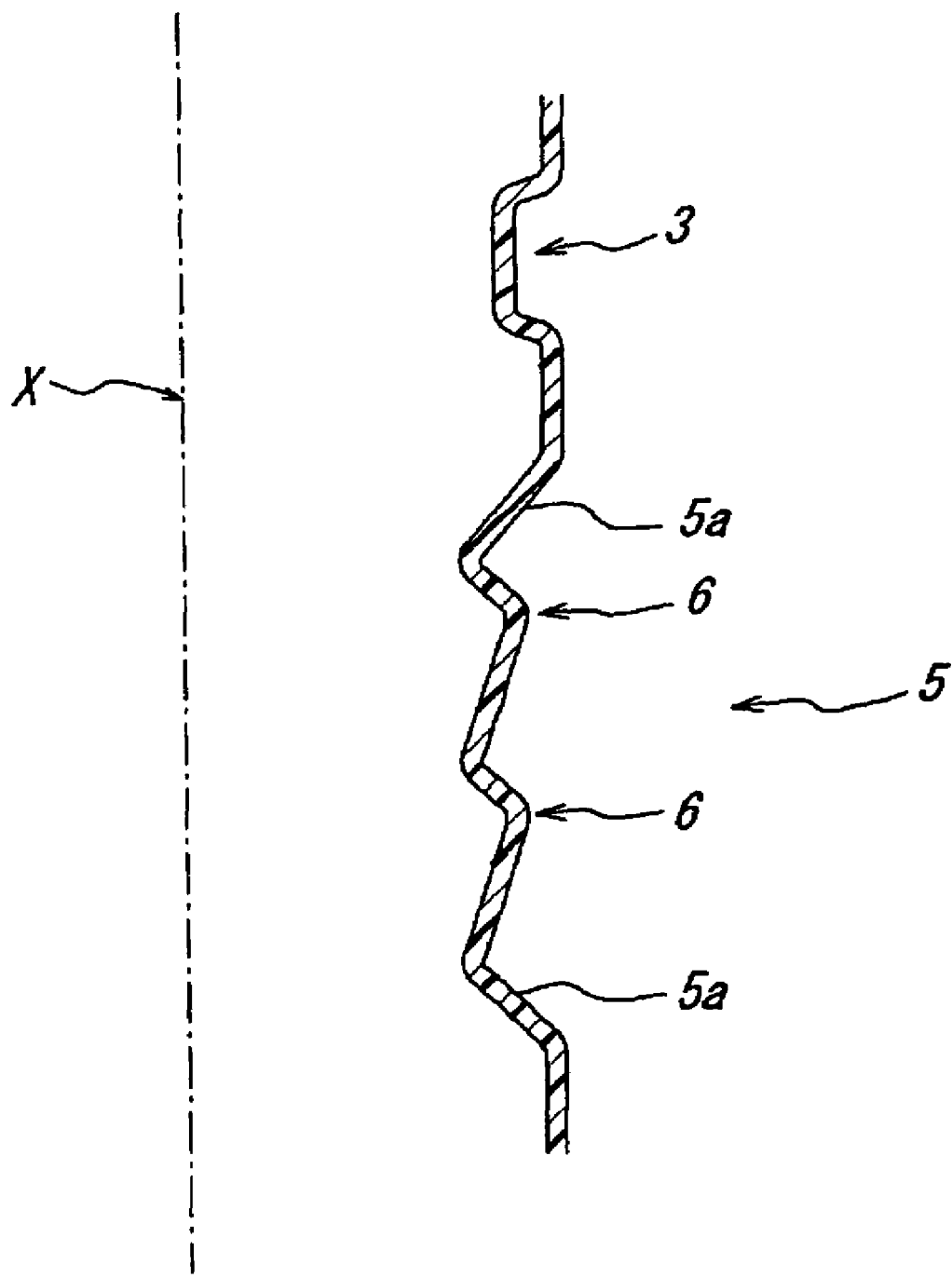
FIG. 2 is a cross-sectional view taken long a line II-II of FIG. 1A.

Reference numerals 6 designate convex portions shown as an example as two portions aligned in a central axis direction of the container with a spacing therebetween, at a wall face 5b of the lower panel 5. The convex portions 6 have ridge lines 6a, 6b, respectively, each of which is in an inverted V-shape downwardly widened from a container mouth part toward a bottom part when viewed from a front side of the container. As shown in FIG. 2, the applicable convex portions 6 are continuously arranged in a stepwise configuration, such that a lower side constituting a cross-section of each convex portion 6 is formed to extend outwardly and upwardly of the body part at an angle of 35° or less relative to a central axis X of the container.

Figure 3:
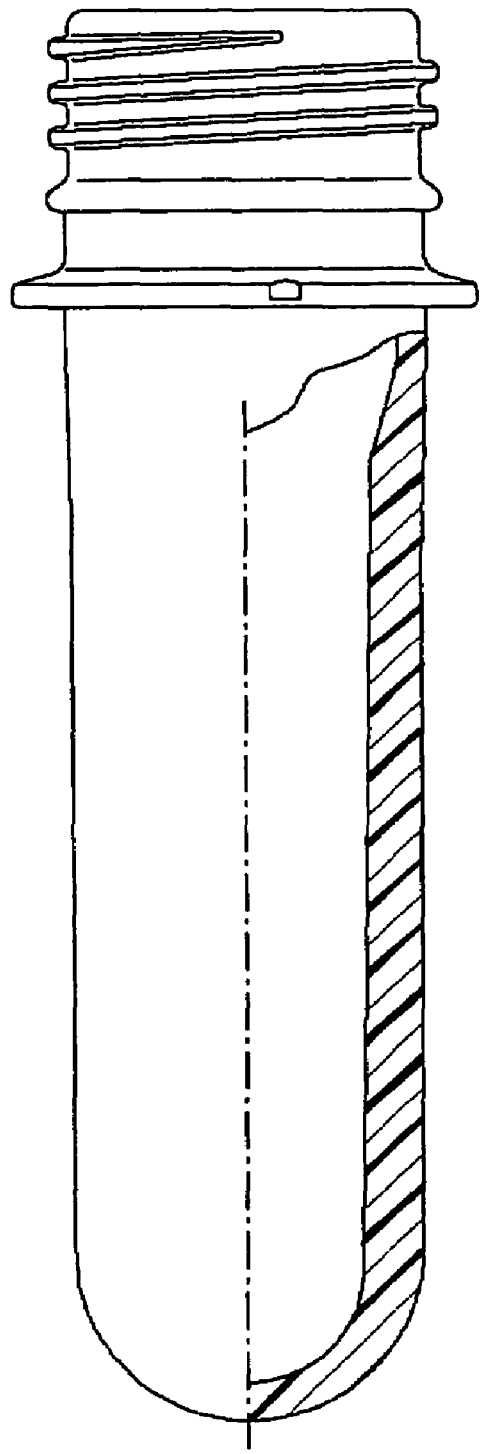
FIG. 3 is a side view of a preform preferably usable for blow molding of the container according to the present invention.

When using a preform shown in FIG. 3 so as to perform biaxial-stretching blow molding of a slender bottle type container, such as that shown in FIGS. 1A, 1B and 1C, under a molding condition of a smaller circumferential draw ratio (typically, a circumferential draw ratio of 2.8 or less, and particularly 2.65 or less), it is general that a resin is rarely stretched at a lower region of the preform so that an upper region of the preform is brought to contact with a mold surface before the lower region contacts with the mold surface. This results in non-uniformity of the resin stretching between the upper region and lower region thereof, and tends to cause resin accumulation and whitening, which in turn cause a defective appearance. Nonetheless, the invention has provided the convex portions 6 at the wall faces of the lower panels 5, respectively, with each convex portion 6 having a mountain-like cross-section having a width larger at a lower side than at an upper side in a circumferential direction. This configuration rarely causes obstructions against vectors directed from the mouth part toward the bottom part in a stretching direction of the resin. Moreover, when the convex portions 6 are each provided to have ridge lines 6a, 6b in the inverted V-shape, the resin is smoothly stretched upon blow molding to thereby mitigate or avoid resin accumulation and whitening.

Particularly, although resin accumulation is apt to be caused at an upper portion of each lower panel 5 upon blow molding, the panel border line at the sidewall 5a at the upper side has an arcuate border line bulged toward the container bottom part. This causes the resin to be more smoothly stretched to thereby more assuredly restrict occurrence of resin accumulation.

It is preferable for each convex portion 6 to have between its ridge lines a central angle θ of about 60° to 125° for bringing about smooth stretching of a resin.

In the above-described embodiment, the convex portions 6 have been shown as examples to include two aligned portions with a spacing therebetween. Continuously arranging the convex portions 6 in a stepwise configuration as shown in FIG. 2 enables a resin to be more smoothly stretched.

Of course the cooperating convex portions 6 can be increased or decreased in number depending on draw ratios and are not limited to two, and the convex portions can be provided not only at the lower panels 5 but also at the upper panels 4, respectively.

Figure 4:
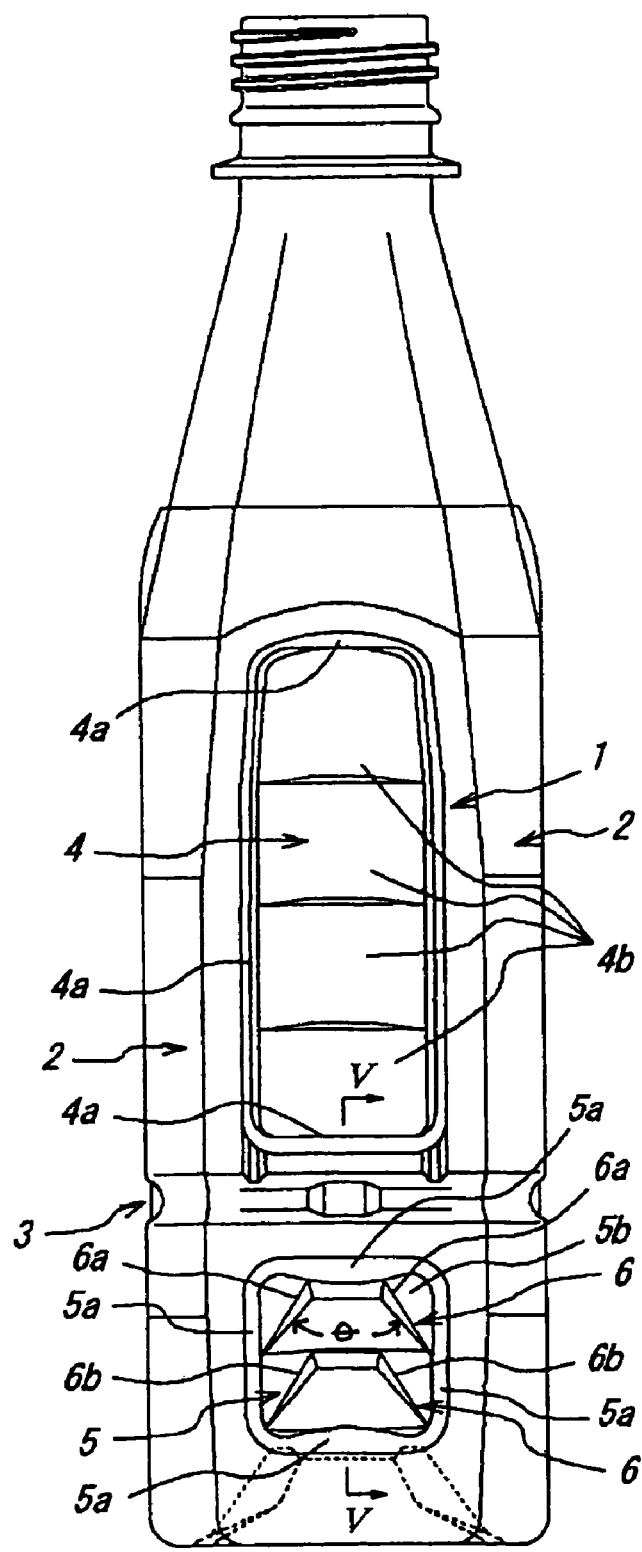
FIG. 4 is a front view of a container according to another embodiment of the present invention.
Figure 5:
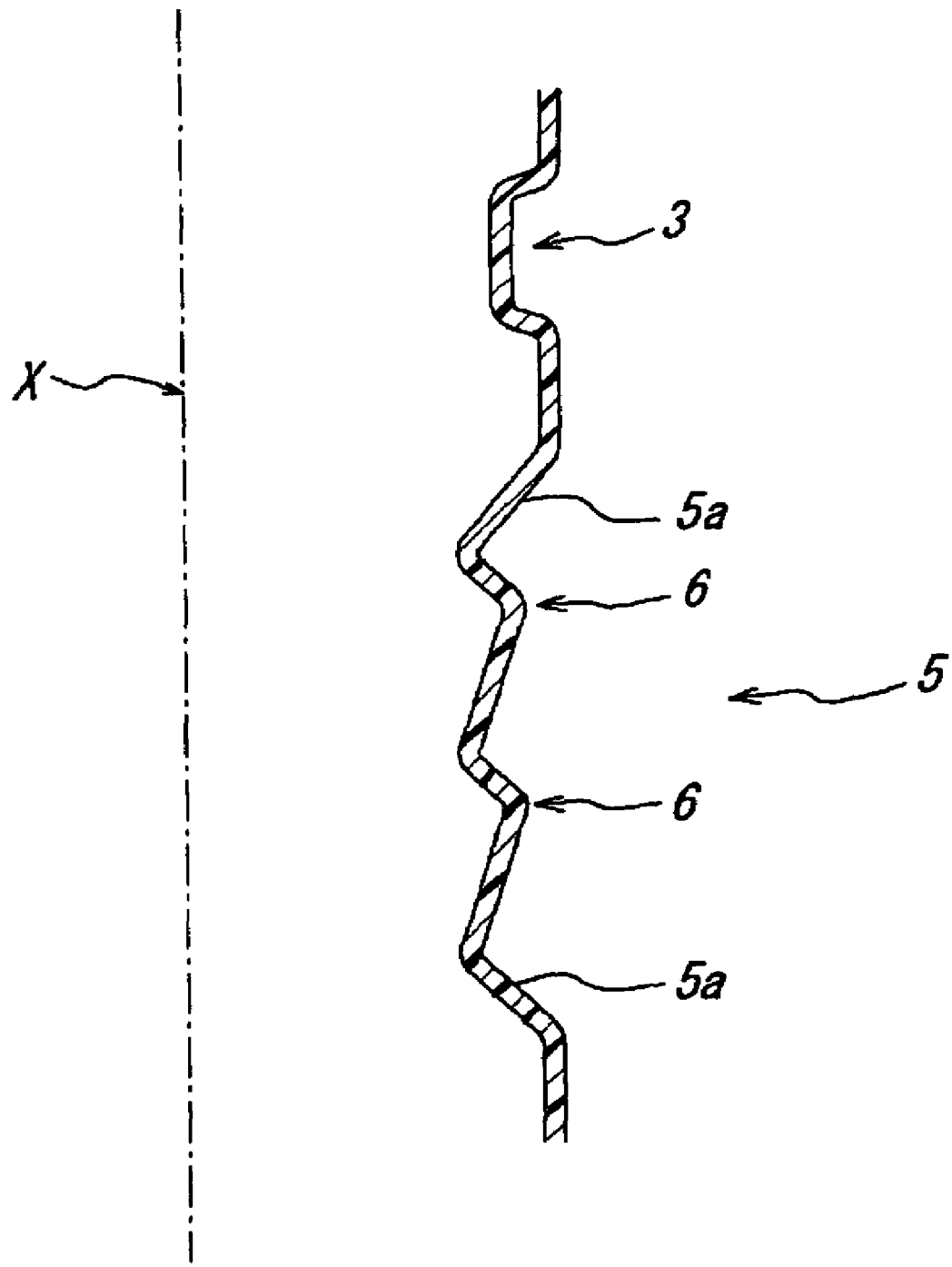
FIG. 5 is a cross-sectional view taken along line V-V of FIG. 4.

In another embodiment shown in FIG. 4 and FIG. 5, convex portions 6 are each configured to have a trapezoidal shape having a width larger at a lower side than at an upper side in a circumferential direction. It is also possible for each convex portion 6 to have a sideways fallen trapezoidal shape in a longitudinal cross-section of a container, such that the trapezoid has a side parallel to a central axis X of the container, as a top side of the trapezoid (i.e., as a region most apart from the central axis X of the container). These may obtain the same effects as the previously described embodiment.

Figure 6:
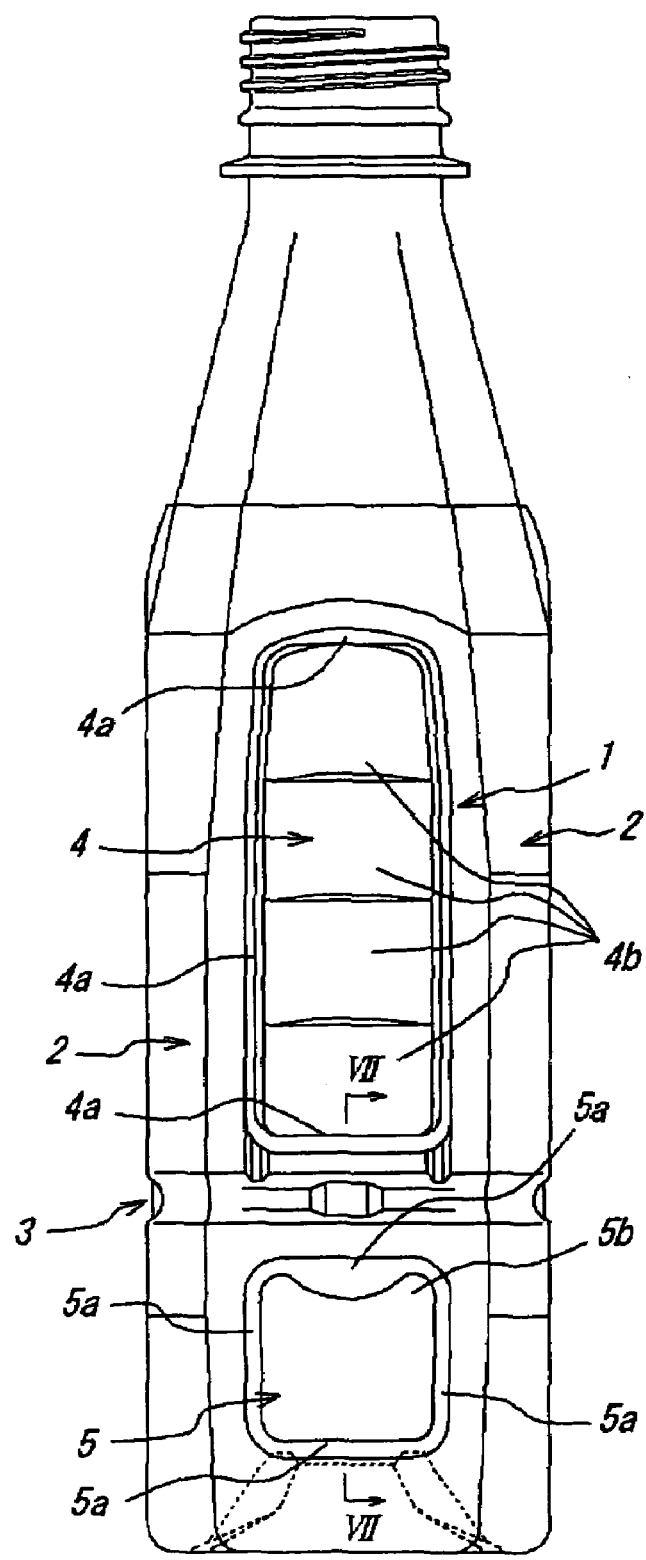
FIG. 6 is a front view of a container according to still another embodiment of the present invention.
Figure 7:
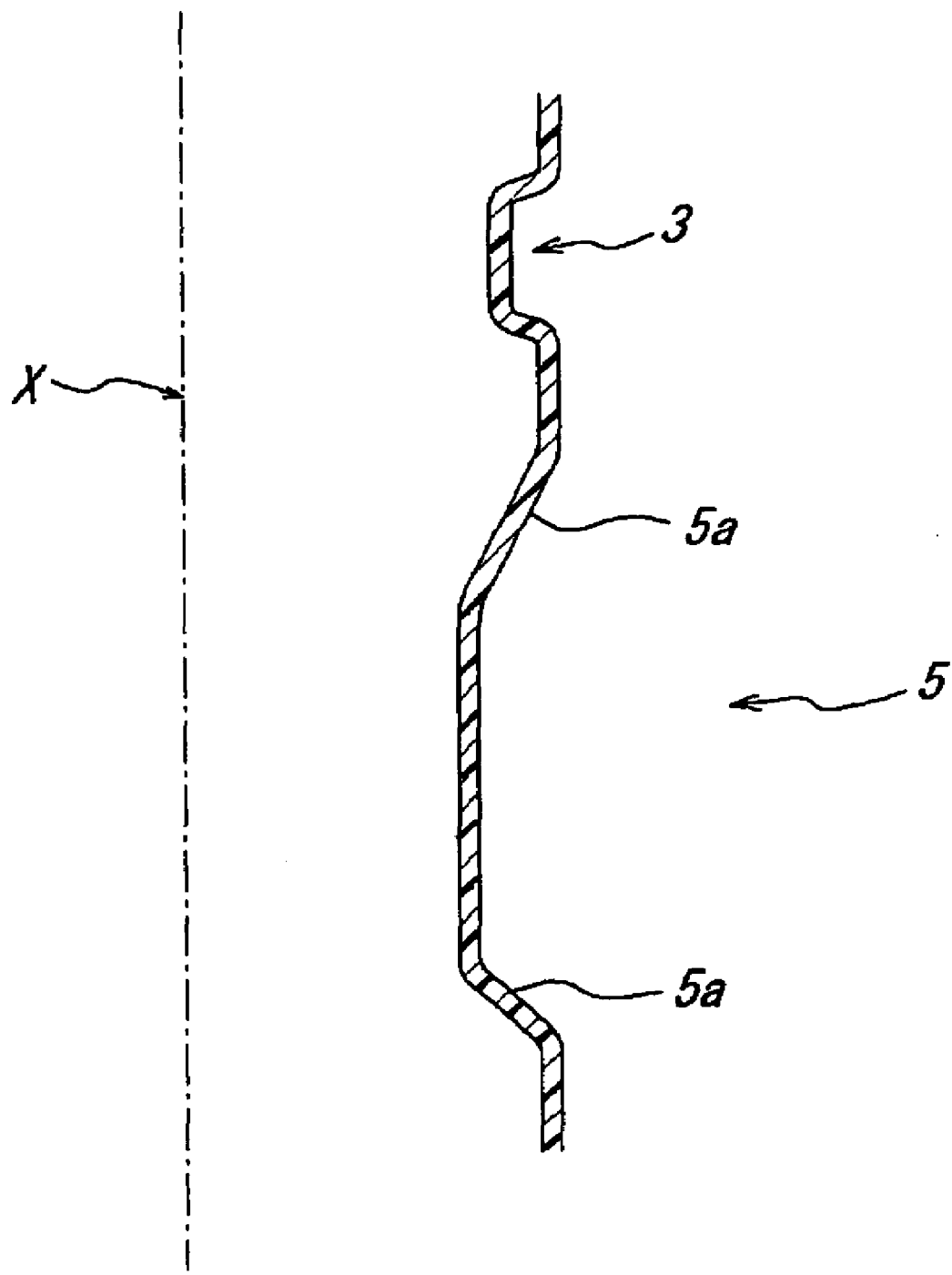
FIG. 7 is a cross-sectional view taken along line VII-VII of FIG. 6.

In an embodiment shown in FIG. 6 and FIG. 7, convex portions 6 are not provided along wall faces 5b of lower panels 5. However, sidewalls 5a positioned at upper sides of the lower panels 5 each comprise a partial sphere defined by an arcuate border line bulged toward a container bottom part. Namely, each sidewall 5a positioned at the upper side of the lower panel 5 has a width larger at an upper side than at a lower side as viewed in a circumferential direction of the container.

In case of biaxial-stretching blow molding of the slender bottle type container, such as that shown in FIG. 6 and FIG. 7, under a molding condition of a smaller circumferential draw ratio, each sidewall 5a has an arcuate panel border line. This sufficiently promotes stretching of a resin, thereby making it possible to effectively restrict occurrence of resin accumulation, even without provision of convex portions 6 along the wall faces 5b of the lower panels 5.

In any one of the above-described embodiments, each border line delimiting the sidewall 5a positioned at the upper side of the lower panel 5 may be in an appropriate shape other than the arcuate shape insofar as it is bulged toward a container bottom part, such as a trapezoidal shape, a V-shape, and a U-shape, each having an upper side longer than a lower side.

According to the invention described above, it is possible to stably mold an excellent slender bottle capable of avoiding the occurrence of a defective appearance of the bottle without adversely affecting heat resistance thereof, by smoothly stretching a resin even at mold surface portions corresponding to concave and convex portions of a body part surface upon blow molding.

The invention is not limited to the above-described embodiments, and many variations and modifications are possible within the scope of the invention.

The invention claimed is:

1. A synthetic resin heat-resistant bottle type container comprising:
   a slender container body part having at least one pressure reduction absorbing panel, the slender container body part being blow-molded from a perform to have a circumferential draw ratio of 2.8 or less;
   at least one convex portion on a flat wall face of the at least one pressure reduction absorbing panel, the convex portion having a width larger at a lower side than at an upper side as viewed in a circumferential direction of the container to reduce obstructions during axial stretching of the slender container body part during blow molding to reduce resin accumulation and whitening of the container body part; and
   a border line formed at a boundary between the flat wall face of the at least one pressure reduction absorbing panel and the slender container body part.

2. The bottle type container of claim 1, wherein the at least one convex portion comprises at least two convex portions aligned in a stepwise configuration on said wall face of the pressure reduction absorbing panel.

3. The bottle type container of claim 1, wherein the convex portion has ridge lines in an inverted V-shape downwardly widened from a container mouth part toward a bottom part.

4. The bottle type container of claim 3, wherein the ridge lines have a central angle of 60° to 125° therebetween.

5. The bottle type container of claim 1, wherein the at least one convex portion is in a trapezoidal shape having an upper side and a lower side parallel to each other, the lower side being longer than the upper side.

6. The bottle type container of claim 5, wherein the trapezoid shape includes opposed sides that are non-parallel to each other and cooperatively define an angle of 60° to 125° therebetween.

7. The bottle type container of claim 1, wherein each pressure reduction absorbing panel has a border line bulged toward a container bottom part.

8. The bottle type container of claim 1, wherein the container has no resin accumulation or whitening at the at least one pressure reduction absorbing panel.

9. The bottle type container of claim 1, wherein the slender container body part has a volume providing a filling capacity of about 350 milliliters.

10. A synthetic resin heat-resistant bottle type container comprising:
    a container body part having a container bottom part, and at least one pressure reduction absorbing panel having a top side, wherein each pressure reduction absorbing panel has a border line formed at a boundary between the at least one pressure reduction absorbing panel and the container body part, the border line including a single bulge located at a boundary between the top side of the at least one pressure reduction absorbing panel and the container body part, the bulge being oriented toward the container bottom part so that a width of the bulge is larger at an upper side than at a lower side of the boundary to restrict resin accumulation,
    wherein the bottle type container is a slender blow-molded bottle type container having a circumferential draw ratio of 2.8 or less.

11. The bottle type container of claim 10, wherein the container has no resin accumulation or whitening at the border line.

12. The bottle type container of claim 10, wherein the container body part has a volume providing a filling capacity of about 350 milliliters.

13. A synthetic resin heat-resistant bottle type container comprising:
    a container body part having a container bottom part and at least one pressure reduction absorbing panel having a top side;
    at least one convex portion having a lower side and an upper side, the at least one convex portion being disposed along a wall face of the at least one pressure reduction absorbing panel, the convex portion having a width larger at the lower side than at the upper side as viewed in a circumferential direction of the container; and
    a border line having a lower side and an upper side, the border line being formed at a boundary between the top side of the at least one pressure reduction absorbing panel and the container body part, the border line being bulged toward the container bottom part so that a width of the bulge is larger at an upper side than at a lower side of the boundary to restrict resin accumulation.

14. The bottle type container of claim 13, wherein the bottle type container has a circumferential draw ratio of 2.8 or less.

15. The bottle type container of claim 14, wherein the container has no resin accumulation or whitening at the at least one pressure reduction absorbing panel or border line.

* * * * *